J. O. LUNDBERG.
EVAPORATION OF LIQUIDS GIVING OFF NOXIOUS GASES.
APPLICATION FILED JULY 31, 1915.
1,198,245.
Patented Sept. 12, 1916.
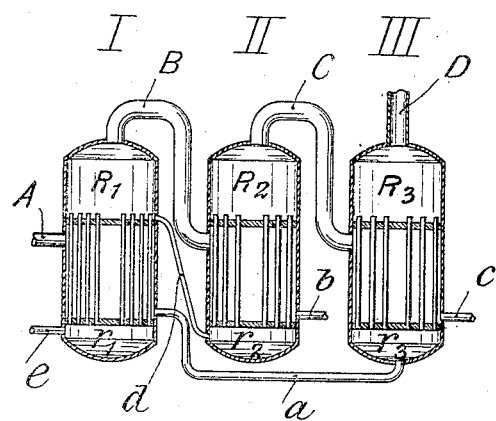
Inventor
J. O. Lundberg
by M. Wallace White
Attorney

UNITED STATES PATENT OFFICE.

JACOB OTTO LUNDBERG, OF FLATEBY, NORWAY.

EVAPORATION OF LIQUIDS GIVING OFF NOXIOUS GASES.

1,198,245.     Specification of Letters Patent.    Patented Sept. 12, 1916.

Application filed July 31, 1915. Serial No. 42,888.

*To all whom it may concern:*

Be it known that I, JACOB OTTO LUNDBERG, civil engineer, citizen of Norway, residing at Flateby, Norway, have invented new and useful Improvements in the Evaporation of Liquids Giving off Noxious Gases, of which the following is a specification.

In the vaporization of especially liquor from sulfate and soda cellulose plants (so-called black-liquor), waste-liquor from sulfite plants, etc., the vapors have not heretofore been utilizable for polystage evaporating systems because of their highly noxious, malodorous or corroding properties.

The present invention has for its object to provide a method by which the exhaust vapor from such systems is obtained in an absolutely pure state, since the vapor to be used outside the evaporating plant, consists not of the liquor to be concentrated, but of another liquid, the vapor of which has not noxious properties.

The accompanying drawing illustrates the method diagrammatically by way of example.

I, II and III— are evaporators of a well-known construction consisting of top chambers —$R_1$, $R_2$, $R_3$— and chambers —$r_1$ $r_2$ $r_3$— interconnected by tubes and surrounded by a jacket to be heated by steam. The black liquor or other liquid to be evaporated is introduced into the container —$r_1$— by a tube —$e$— from a pump. Then steam under high pressure is introduced through tube —A—, the liquid boils in the container —$r_1$—, foams up and the vapor is driven through the tube —B— into the jacket of the vessel —II—. The liquid which is not evaporated passes by the tube —$d$— to the container —$r_2$— of vessel —II— in order to be further evaporated. The steam introduced at —A— is condensed and the condensation is conducted, in accordance with an embodiment of my method, by the tube —$a$— to the container —$r_3$— of the vessel —III— in order to be evaporated by the exhaust vapor coming by the tube —C— from the vessel —II—.

The waste products from —$b$— and —$c$— may be conducted to a place, where liquid that is not quite pure, may be utilized, for instance for preheating the liquor before it passes into the vessel —I—. From the tube —D—, however, pure steam of a lower pressure is obtained, such steam being produced by the waste product of the same pure steam which was conducted from the steam boiler to the vessel —I—.

Instead of using the products from the tube —$a$—, the container —$r_3$— may be supplied with pure water or with another liquid, the vapor of which has not noxious properties, if such a liquid be present.

As a specially suitable step should be mentioned, that the waste products in the tube —$a$— may be conducted back and again pumped into the steam boiler which produces the high pressure steam conducted to the tube —A—, while the container —$r_3$— can be supplied with the waste products from for instance the drying portion of a paper making machine, to which the low pressure steam is conducted by the tube —D—. The invention can also be utilized in other industries, especially the sugar industry.

Having now described my invention, what I claim as new and desire to secure by Letters Patent is:

1. Method of evaporating liquids giving off malodorous or noxious vapors, and conserving the heat contained in the vapors produced by this evaporation, consisting in condensing the vapors produced and utilizing the heat released by such condensation to produce vapors from another liquid, the vapors of which have not noxious properties, the said liquid being during its evaporation bodily separated from the vapors first mentioned.

2. Method of evaporating liquids giving off malodorous or noxious vapors, and conserving the heat contained in the vapors produced by this evaporation, consisting in evaporating the liquid in a plurality of stages receiving as a heating medium the vapors from the preceding stage and as a liquid the non-evaporated part from the preceding stage, except the first stage which is supplied with steam as a heating medium and the last stage which as a liquid receives the condensed steam from the first stage.

3. Method of evaporating liquids giving off malodorous or noxious vapors, and conserving the heat contained in the vapors produced by this evaporation, consisting in evaporating the liquid in a plurality of stages receiving as a heating medium the vapors from the preceding stage and as a liquid the non-evaporated part from the preceding stage, except the first stage which is supplied with steam as a heating medium and the last stage which as a liquid receives the condensed steam obtained by utilizing the heat of the vapors produced in the said last stages.

In testimony whereof I have signed my name to this specification in the presence of two subscribing witnesses.

JACOB OTTO LUNDBERG.

Witnesses:
AXEL LAHN,
MOGENS BUGGE.